(12) United States Patent
Denys et al.

(10) Patent No.: US 7,810,840 B2
(45) Date of Patent: Oct. 12, 2010

(54) AIRBAG WITH A VENTING REGULATION DEVICE

(75) Inventors: Isabelle Denys, Valladolid (ES); Luis Jose Duarte De Arez, Valladolid (ES)

(73) Assignee: Dalphi Metal Espana, S.A., Madrid (ES)

( * ) Notice: Subject to any disclaimer, the term of this patent is extended or adjusted under 35 U.S.C. 154(b) by 87 days.

(21) Appl. No.: 12/151,738

(22) Filed: May 8, 2008

(65) Prior Publication Data

US 2008/0277912 A1    Nov. 13, 2008

(30) Foreign Application Priority Data

May 10, 2007    (EP)    ................... 07381038

(51) Int. Cl.
    *B60R 21/239*    (2006.01)
(52) U.S. Cl. .............. 280/739; 280/742; 280/743.1
(58) Field of Classification Search ................ 280/739, 280/742, 743.1; 137/859; 220/89.1; 383/103
    See application file for complete search history.

(56) References Cited

U.S. PATENT DOCUMENTS 3,820,814 A * 6/1974 Brambilla et al. ........... 280/742
6,139,048 A   10/2000 Braunschadel 2004/0090054 A1   5/2004  Bossecker et al.
2006/0151979 A1   7/2006  DePottey et al.
2006/0290116 A1 * 12/2006 Bradburn ................... 280/739
2007/0273133 A1   11/2007 Zauritz et al.

FOREIGN PATENT DOCUMENTS

EP          1834848 A2 *   9/2007
ES          2182629        3/2003
WO    WO 2006136206 A1 * 12/2006

OTHER PUBLICATIONS

English Abstract of ES2,182,629, Mar. 1, 2003.

* cited by examiner

*Primary Examiner*—Toan C To
*Assistant Examiner*—Keith Frisby
(74) *Attorney, Agent, or Firm*—Ladas & Parry

(57) ABSTRACT

An airbag for automotive vehicles with a gas venting regulation device assembled around a venting opening (11) comprising a first part (15) joined to the inflatable cushion (13) covering the venting opening (11), formed by an elastic area (31) and a non-elastic area (33) with a plurality of openings (17, 19) for the passage of gas; a second rigid part (21) joined to the inflatable cushion (13) and to the first part (15), with a projecting neck (23) forming a gas outlet mouth; and in which at least one part of the non-elastic area (33) is arranged such that when the first part (15) is deformed as a result of the internal pressure in the inflatable cushion during its deployment, the passage of gas through the openings (17) is completely or partially sealed by the projecting neck (23).

6 Claims, 2 Drawing Sheets

AIRBAG WITH A VENTING REGULATION DEVICE

FIELD OF THE INVENTION

The present invention relates to a venting regulation device of airbags used in automobiles to dampen impacts experienced by drivers and passengers in the event of impacts or collisions.

BACKGROUND OF THE INVENTION

Airbags basically consist of a folded cushion that is quickly inflated by means of a gas produced by a generator when certain sensor devices detect a collision of the vehicle. The cushion is thus deployed in front of the driver or a passenger, depending on the location thereof, and prevents their bodies from hitting against any area of the vehicle.

In normal cushion deployment operation, the internal pressure produced by the generator when the cushion is filled with gas may be high enough to cause the cushion to be so hard that the occupant bounces off it. To prevent this drawback, they have been provided with a venting opening serving to reduce internal pressure of the cushion and, accordingly, the possibility of causing damage when they are activated.

The use of several means of blocking this venting opening to achieve a better control of the internal pressure in the cushion than that provided by only the variation of the size of the opening is in turn known. In this sense, the use of patches for achieving that the gas does not exit the discharge opening immediately but rather when the patch breaks as a given pressure inside the cushion has been reached, must be pointed out. The art has proposed different types of patches with different means for controlling the breaking thereof, more or less according to a certain resistance to the gas pressure inside the cushion. The presence of the gas pressure required for the cushion to carry out its protective function is thus made compatible with the assurance that the gas pressure will not reach an excessive value, with the risk for the people for whom the cushion is deployed.

Additionally, venting devices that allow increasing the gas outlet flow according to the specific characteristics of each collision and the type of passenger involved have also become necessary, and to that effect several venting device solutions providing adjustable surface venting openings facilitating the increase of the venting area as the internal pressure in the cushion increases are also known.

A newly arisen need involves the need for airbags that allow reducing the venting area, even completely eliminating it, in certain impact conditions, which requires closing mechanisms that must function in the sense opposite to the art known up until now. The traditional previously mentioned patches had to completely seal the outlet opening until the internal gas pressure inside the cushion did not reach a given level and then they broke, no longer functioning; now the opposite is required: devices that allow closing the venting opening when it is already open when the internal pressure of the cushion reaches certain levels.

Spanish patent ES 2,182,629, U.S. Pat. No. 6,139,048, patent applications US 2004/0090054, WO 2006/024472, WO 2006/136206 and US 2006/0151979 describe devices using moving elements to close the venting opening using the stresses produced in the cushion due to the pressure difference together with the difference of how the occupant strikes the airbag.

Notwithstanding the foregoing, the automotive industry constantly demands venting regulation devices that can meet the growing needs of airbags to adapt to the conditions of the impact and to the features of the vehicle occupant to be protected.

SUMMARY OF THE INVENTION

An objective of the present invention is to provide a venting regulation device of an airbag allowing venting that can be adjusted to different conditions of severity of the impact or collision. It aims to take into consideration the different configurations of the impact and the evolutions provided therein (increase of the impact velocity, barrier change, . . .) contemplated by the administrative regulations and/or regulations demanded by the consumers.

Another objective of the present invention is to provide an airbag without gas losses—or with little gas losses—in the initial deployment phase.

These and other objectives are achieved by means of an airbag for automotive vehicles the inflatable cushion of which has at least one gas venting opening, characterized in that it includes a venting regulation device assembled around said opening comprising a first part, joined to the inflatable cushion covering the venting opening, formed by an elastic area and a non-elastic area with a plurality of openings for the passage of gas, a second rigid part joined to the inflatable cushion and to said first part, with a projecting neck forming a gas outlet mouth, and in which at least one part of said non-elastic area is arranged such that when the first part is deformed as a result of the internal pressure in the inflatable cushion, the passage of gas through said openings of the first part is completely or partially sealed by said projecting neck.

In a preferred embodiment, said projecting neck is inclined towards the center of the opening of the inflatable cushion and said part of said non-elastic area is arranged opposite to said projecting neck.

The main advantage of the present invention is that it achieves an airbag module with an improved efficiency as it reduces gas losses in the initial deployment phase and which adapts to the features of the occupant by reducing the possible injuries caused when entering into contact with it.

Other advantages include the following:

It can be easily integrated in the inflatable cushion.

It can be used in frontal airbags and in side airbags.

It is passive and therefore requires no electrical signal to be activated.

It has a reduced number of components and some of them, such as the mouth part, can be part of the casing or even of the part of the vehicle in which the airbag module is installed.

Other features and advantages of the present invention will become evident from the following detailed description of an illustrative and by no means limiting embodiment of its object in relation to the attached drawings.

DETAILED DESCRIPTION OF THE INVENTION

Figure 1A:
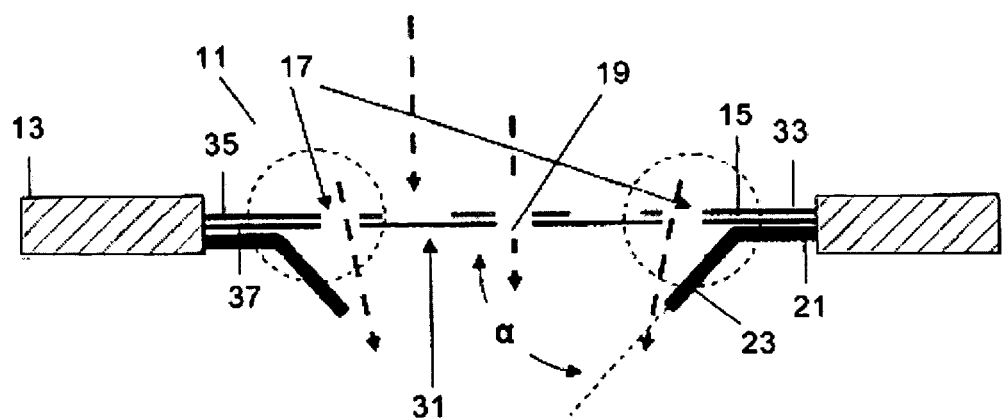
FIGS. 1a and 1b schematically show the operation of the venting regulation device according to an embodiment of the present invention.
Figure 1B:
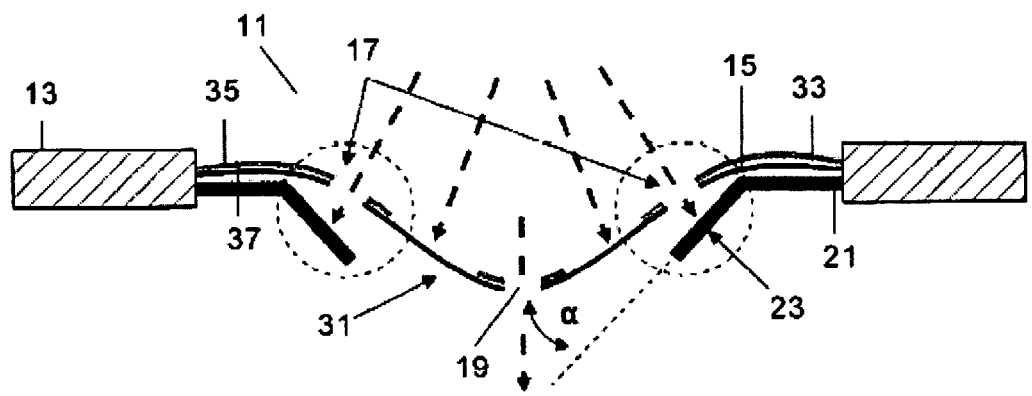

According to FIGS. 1a and 1b, it can be seen that the venting regulation device according to the present invention described is applied on a venting opening 11 of an inflatable cushion 13 of an airbag module and is formed by a first part 15 with peripheral openings 17 and a central opening 19 for the passage of gas and a second part 21 with a projecting neck 23 inclined towards the center of the opening 11.

Both parts 15, 21 are joined to the cushion 13 covering the venting opening 11.

The second part 21 is made of a rigid material such that it is not deformed during the deployment of the inflatable cushion 13 and its projecting neck 23 acts as a gas outlet mouth represented by the arrows with a dotted line.

The first part 15 is formed by an elastic area 31, that can be deformed with pressure exerted in the inflatable cushion 13 by the gas provided by the generator of the airbag module, and by a non-elastic area 33 around the peripheral openings 17 and the central opening 19, with sufficient rigidity so as to keep the area of said openings unchanged during deployment of the inflatable cushion 13. The peripheral openings 17 are located in the first part 15 in a position opposite to the projecting neck 23 such that when there is insufficient pressure inside the inflatable cushion 13 to deform the first part 15, the gas may exit through said openings 17 since the magnitude of the angle $\alpha$ between the projecting neck 23 and the first part 15 allows it (FIG. 1a), but when said pressure exceeds a predetermined level and deforms the first part 15, the magnitude of the angle $\alpha$ is reduced, and subsequently the projecting neck 23 completely or partially seals the gas outlet through the openings 17 (FIG. 1b).

The central opening 19 has an optional character in the venting regulation device according to the present invention and is included in those cases in which a minimum venting level is to be assured.

Figure 2:
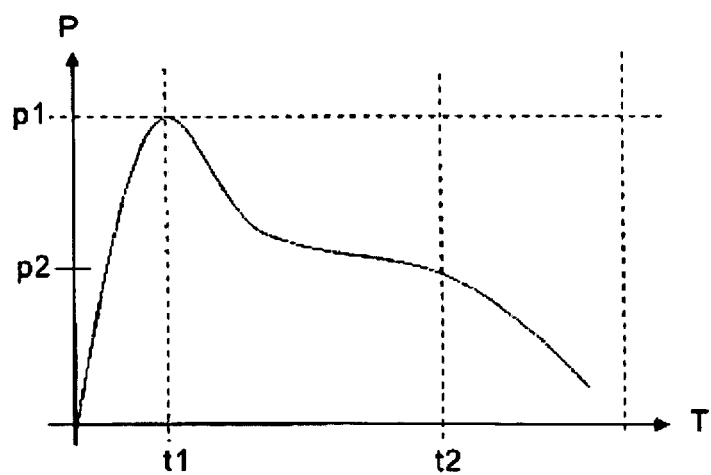
FIG. 2 shows a pressure-time diagram during the deployment of an airbag with a venting regulation device according to the present invention.

As is shown in the pressure-time diagram of FIG. 2, the venting regulation device according to the present invention would function as follows during the deployment of the cushion 13:

Initially the gas can exit through all the peripheral openings 17 of the first part 15.

In instant t1 in which maximum pressure p1 is reached inside the inflatable cushion 13, the passage of gas through the peripheral openings 17 is (completely or partially) closed since the first part 15 is deformed such that the projecting neck 23 acts as a seal for said openings 17.

In instant t2, pressure p2 inside the inflatable cushion 13 is less than in the previous instant, and accordingly the deformation of the first part 15 is reduced, meaning that more gas can pass through the peripheral openings 17 than in the previous instant.

At the end of the deployment, the pressure is reduced inside the inflatable cushion 13, thereby recovering the initial state.

FIGS. 1a and 1b show the first part 15 with two lines illustrating a possible embodiment thereof with two parts 35, 37 made of materials having different levels of elasticity, for example a fabric in the case of part 35 and an elastomer in the case of part 37. Parts 35, 37 are usually manufactured separately and can be joined together either when they are assembled in the venting device or prior to that time, for example joining a disk made of an elastomer (silicon or the like) with a fabric calendered by a heat process.

The first part 15 can also be made as a single piece manufactured with a single material but with a variable thickness (thicker in the non-elastic areas than in the elastic areas).

The first part 15 can also be made as a single piece manufactured with a single material but with certain geometric features in certain areas of the device, for example ribs in certain areas preventing an elongation of the part in those areas.

The first part 15 can also be manufactured from different materials duly integrated during its manufacture.

The control variables of the regulation device according to the invention are the surface of the peripheral openings 17 of the first part 15, the angle existing between the projecting neck 23 of the second part 21 and the first part 15 in standby and the degree of deformability of the first part 15 provided by the elastic area 31. Providing venting regulation devices having different features to tend to different demands is thereby facilitated.

In a preferred embodiment of the present invention, the angle existing between the projecting neck 23 of the second part 21 and the first part 15 in standby is comprised between 20° and 70°.

Figure 3:
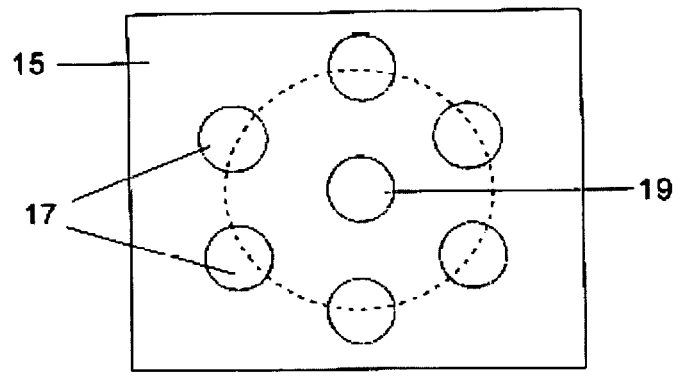
FIGS. 3-6 show the positions of the openings for the passage of gas in several embodiments of the first part of the venting regulation device according to the present invention.
Figure 4:
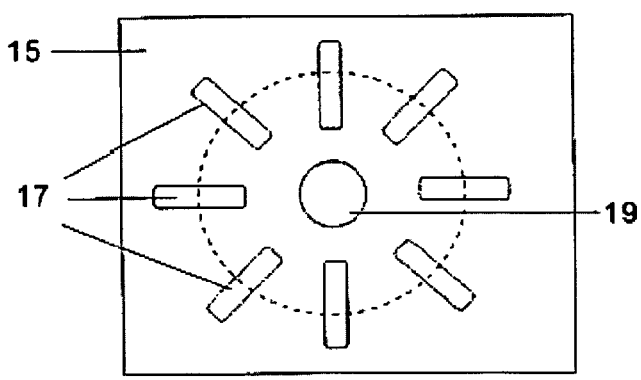
Figure 5:
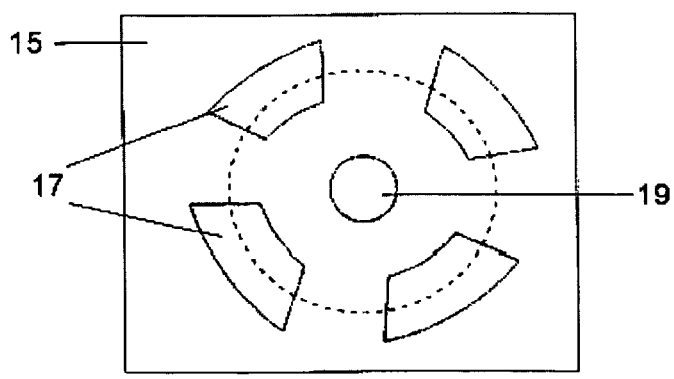

FIGS. 3-5 show three embodiments of the first part 15 with a central opening 19 and peripheral openings 17 that are, respectively, circular, rectangular and circular segment shaped, the central points of which are located along a hypothetical circumference.

Figure 6:
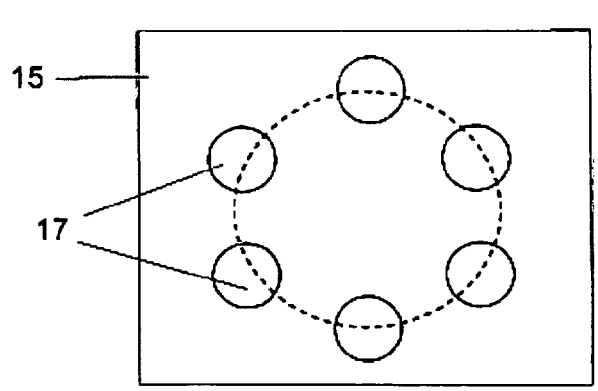

FIG. 6 shows an embodiment of the first part similar to that of FIG. 3 without the central opening 19.

Although several embodiments of the invention have been described and shown, modifications comprised within the scope thereof can be introduced, the scope not being limited to said embodiment but to the content of the following claims.

The invention claimed is:

1. An airbag for automotive vehicles the inflatable cushion (13) of which has at least one gas venting opening (11) and includes a gas venting regulation device assembled around said opening (11), said airbag comprising:
   a) a first part (15) joined to the inflatable cushion (13) covering the venting opening (11), formed by an elastic area (31) and a non-elastic area (33) with a plurality of openings (17, 19) for the passage of gas;
   b) a second rigid part (21) joined to the inflatable cushion (13) and to said first part (15), with a projecting neck (23) forming a gas outlet mouth;
   and in which at least one part of said non-elastic area (33) is arranged such that when the first part (15) is deformed as a result of the internal pressure in the inflatable cushion during its deployment, the passage of gas through its openings (17) is completely or partially sealed by said projecting neck (23);
   wherein said non-elastic area (33) comprises a first sub-area with an opening (19) located in the center of the first part (15) and a second sub-area with a plurality of openings (17) located in the periphery of the first part (15), said elastic area (31) being located between both sub-areas.

2. An airbag for automotive vehicles according to claim 1, characterized in that said projecting neck (23) is inclined towards the center of the opening (11) and said at least one part of said non-elastic area (33) is arranged opposite to said projecting neck (23).

3. An airbag for automotive vehicles according to claim 1, characterized in that all of said non-elastic area (33) is located in the periphery of the first part (15) and said elastic area (31) is located in the center of the first part (15).

4. An airbag for automotive vehicles according to claim 3, characterized in that the central point of the plurality of openings (17) located in the periphery of the first part (15) is located along a hypothetical circumference having a center coinciding with the center of the first part (15).

5. An airbag for automotive vehicles according to claim 4, characterized in that said openings (17) have one of the following shapes:
Circular shape
Rectangular shape with the major side oriented towards the center of the first part
Circular segment shape.

6. An airbag for automotive vehicles according to claim 1, characterized in that the angle existing between the projecting neck (23) of the second part (21) and the first part (15) in standby is comprised between 20° and 70°.

* * * * *